United States Patent [19]

Mueller et al.

[11] Patent Number: 5,441,927
[45] Date of Patent: Aug. 15, 1995

[54] FLUID DRILL-HOLE TREATMENT AGENTS BASED ON POLYCARBOXYLIC ACID DIESTERS

[75] Inventors: Heinz Mueller, Monheim; Claus-Peter Herold, Mettmann; Stephan von Tapavicza, Erkrath; Johann F. Fues, Grevenbroich, all of Germany

[73] Assignee: Henkel Kommanditgesellschaft auf Aktien, Duesseldorf, Germany

[21] Appl. No.: 336,726

[22] Filed: Nov. 9, 1994

Related U.S. Application Data

[63] Continuation of Ser. No. 958,324, which is a continuation of PCT/EP91/01058, Jun. 7, 1991, publish as WO91/1977, Dec. 26, 1991, abandoned.

[30] Foreign Application Priority Data

Jun. 16, 1990 [DE] Germany .................. 40 19 266.0

[51] Int. Cl.$^6$ ............................ C09K 7/06; C09K 7/02
[52] U.S. Cl. .................................................. 507/138
[58] Field of Search ........................................ 507/138

[56] References Cited

U.S. PATENT DOCUMENTS

| | | | |
|---|---|---|---|
| 4,053,491 | 10/1977 | Koch et al. | 260/410.6 |
| 4,374,737 | 2/1983 | Larson et al. | 252/8.5 |
| 4,481,121 | 11/1984 | Barthel | 252/8.5 |
| 5,106,516 | 4/1992 | Mueller et al. | 507/138 |
| 5,194,422 | 3/1993 | Mueller et al. | 507/136 |
| 5,232,910 | 8/1993 | Mueller et al. | 507/138 |
| 5,252,554 | 10/1993 | Mueller et al. | 507/138 |
| 5,318,954 | 6/1994 | Mueller et al. | 507/138 |
| 5,318,955 | 6/1994 | Mueller et al. | 507/139 |
| 5,318,956 | 6/1994 | Mueller et al. | 507/139 |
| 5,348,938 | 9/1994 | Mueller et al. | 507/139 |

FOREIGN PATENT DOCUMENTS

| | | |
|---|---|---|
| 386636 | 1/1990 | European Pat. Off. . |
| 398113 | 5/1990 | European Pat. Off. . |
| 0386636 | 1/1990 | European Pat. Off. . |
| 0398113 | 11/1990 | European Pat. Off. . |
| 2302918 | 7/1974 | Germany . |
| 2302918 | 7/1974 | Germany . |
| 3521711 | 12/1986 | Germany . |
| 3842659 | 6/1990 | Germany . |
| 3842703 | 6/1990 | Germany . |
| 3903784 | 8/1990 | Germany . |
| 3903785 | 8/1990 | Germany . |
| 3907391 | 9/1990 | Germany . |
| 3907392 | 9/1990 | Germany . |
| 3911238 | 10/1990 | Germany . |
| 3911299 | 10/1990 | Germany . |
| 3915875 | 11/1990 | Germany . |
| 3915876 | 11/1990 | Germany . |
| 3916550 | 11/1990 | Germany . |
| 4018228 | 12/1991 | Germany . |

OTHER PUBLICATIONS

R. B. Bennett, "New Drilling Fluid Technology—Mineral Oil Mud", Journal of Petroleum Technology 1984, 975–981.

(List continued on next page.)

*Primary Examiner*—Philip Tucker
*Attorney, Agent, or Firm*—Ernest G. Szoke; Wayne C. Jaeschke; Real J. Grandmaison

[57] ABSTRACT

Described is the use of oleophilic esters of ecologically compatible polycarboxylic acids with oil-soluble and ecologically compatible monofunctional alcohols and/or polyfunctional alcohols which may also be water-soluble as the oil phase or as a component of the oil phase of oil-based or water-based drilling fluids and other fluid drill-hole treatment agents. The oleophilic polycarboxylic acid esters are especially suitable as component of the continuous oil phase of inverted fluids of the W/O type. Here—if rheologically suitable compounds will be employed—they may comprise the at least predominant portion of the continuous oil phase; but also possible is the concomitant use of complex oleophilic polycarboxylic acid esters, which are not or just to a restricted degree fluid in a temperature range of from 0° C. to 20° C., as an additive in fluid oils of the class of the non-polluting oils. Here, suitable oil mixing phases especially are oleophilic alcohols, ethers, respective esters of monocarboxylic acids and fluid oils based on oleophilic carbonic acid diesters.

34 Claims, No Drawings

OTHER PUBLICATIONS

Boyd et al., "New Base Oil Used in Low-Toxicity Oil Muds, Soc. of Petroleum Engineers", 1985, pp. 137–152.

M. Wildersohn, "Tribologie und Schmierstofftechnik", vol. 32, 1985, pp. 70–75.

Walker et al., "Potassium Modified Lime Muds Improve Shale Stability", World Oil, 1983, pp. 93–97.

Petroleum Engineer International, "Potassium Carbonate Fluid Inhibits Highly Reactive Clays", 1987, pp. 32–40.

Bourgoyne et al, "Applied Drilling Engineering".

Gray & Darley, "Composition and Properties of Oil Well Drilling Fluids," pp. 51 et seq.

Ullmann, "Enzyklopädie der technischen Chemie," 4th Edition, (1984), vol. 20, pp. 457–671 Article unavailable.

FLUID DRILL-HOLE TREATMENT AGENTS BASED ON POLYCARBOXYLIC ACID DIESTERS

This application is a continuation of application Ser. No. 07/958,324, filed on Jul. 1, 1993, now abandoned, which is a continuation of International Application PCT/EP91/01058, filed Jun. 7, 1991 now WO 91/1977, the disclosure of which is incorporated by reference herein.

BACKGROUND OF THE INVENTION

1. Field of the Invention

The invention relates to novel drill-hole treatment agents which are fluid under normal conditions and have been composed by using an oil phase in combination. Referring to a characteristic example for treating agents of this kind, the invention is described hereinbelow by way of drilling fluids and drilling muds formed therewith. However, the field of application of the modification according to the invention of auxiliary liquids of the kind involved here is not limited thereto, while it also includes in particular the areas of spotting fluids, spacers, auxiliary liquids for workover and stimulation and for fracturing.

Concerned by the invention are auxiliary liquids of the kind mentioned which are oil-based, i.e. which work using a continuous oil phase, as well as auxiliary agents wherein the oil phase has been emulsified in an especially aqueous continuous phase. Here, drilling fluids and drilling muds formed therewith are characteristic examples of the various possibilities.

There have been known, on the one hand, water-based drilling fluids having a content of from about 1 to 50% of emulsified oil phase—besides the other conventional auxiliary materials of such a drilling fluid—which are designated as emulsion fluids. On the other hand, there are being used to a wide extent in practice oil-based fluid systems wherein the oil constitutes the fluid phase or at least the predominant portion of the fluid phase. Here the so-called inverted drilling muds are of particular importance which, based on W/O emulsions, contain a dispersed aqueous phase in the continuous phase. The content of the dispersed aqueous phase usually is within the range of from about 5 to 50% by weight. The invention equally relates to both of the fields as mentioned here of the oil-based sweeping systems and of the water-based sweeping systems based on emulsions.

The use of the new fluid drilling-hole treatment agents is of particular importance for the exploitation of crude oil and natural gas, especially in the marine sector, while it is not limited thereto. The new systems may find general use in terrestrial drilling, for example in geothermal drilling, water drilling, in carrying out geoscientific drilling and in drilling in the field of mining.

2. Prior art

Liquid sweeping systems for rock-drilling to bring-up the removed drill cuttings have been known to restrictedly thickened fluid systems which may be assigned to one of the three following classes:

Merely aqueous drilling fluids, oil-based drilling fluid systems which, as a rule, are used as so-called inverted emulsion drilling muds, and the water-based O/W emulsions which contain a heterogeneous finely dispersed oil phase in a continuous aqueous phase.

Drilling fluids having a continuous oil base in general are composed as a three-phase system: Oil, water and finely divided solids. Therein the aqueous phase has been heterogeneously distributed in a finely dispersed state in the continuous oil phase. A multiplicity of additives is provided, more specifically emulsifiers, weighting agents, fluid-loss additives, alkali reserve, viscosity modifiers and the like. As to details, reference is made, for example, to the publications P. A. Boyd et al., "New Base Oil Used in Low-Toxicity Oil Muds", Journal of Petroleum Technology 1985, 137 to 152, and R. B. Bennett, "New Drilling Fluid Technology—Mineral Oil Mud", Journal of Petroleum Technology 1984, 975 to 981, as well as the literature quoted therein.

Drilling fluids comprised of water-based O/W emulsion systems with view to their utility properties occupy an intermediate position between the neat aqueous systems and the oil-based inverted fluids. Extensive substantial information is found in the pertinent technical literature; reference may be made, for example, to G. R. Gray and H. C. H. Darley, "Composition and Properties of Oil Well Drilling Fluids", 4th Edition, 1980/81, Gulf Publishing Co., Houston, and the voluminous substantial and patent literature quoted therein, and to the reference book "Applied Drilling Engineering", Adam T. Bourgoyne Jr. et al., First Printing Society of Petroleum Engineers, Richardson, Tex. (U.S.A.).

Today the oil phases of drilling fluids of the type described here and comparably composed other drill-hole treatment agents in practice are almost exclusively formed by mineral oil fractions. This involves a considerable environmental pollution, if, for example, the drilling muds directly or via the drilled rock will infiltrate the environment. Mineral oils are only difficult to decompose and are virtually not anerobically degradable at all and, thus, to be rated as long-term pollutants.

More recently there have been made some proposals to reduce the above problems. Thus, the U.S. Pat. Nos. 4,374,737 and 4,481,121 describe oil-based inverted drilling fluids wherein so-called non-polluting oils are reported to have been used. As the non-polluting oils there have been mentioned side by side and equivalently mineral oil fractions which are free of aromatics and ester oil of vegetable and animal origin. Said ester oils are triglycerides of natural fatty acids which are known to have a high environmental compatibility and under ecological considerations are clearly superior to hydrocarbon fractions.

Applicant, in a greater number of older publications, describes proposals substituting the mineral oil fractions with ecologically compatible readily degradable oil phases. Thereby, four different types of substituting oils have been presented which may also be used as mixtures. They include selected oleophilic monocarboxylic acid esters, at least largely waterinsoluble alcohols which are fluid under the operation conditions, corresponding ethers and selected carbonic acid esters. In summary, reference is made here to the older applications U.S. Ser. No. 07/759,097, now U.S. Pat. No. 5,232,910; U.S. Ser. No. 07/825,431, now U.S. Pat. No. 5,252,554; U.S. Ser. No. 07/752,694, now abandoned; U.S. Ser. No. 07/752,692, now abandoned; U.S. Ser. No. 07/825,436, now U.S. Pat. No. 5,254,531; U.S. Ser. No. 07/478,189, now U.S. Pat. No. 5,106,516; U.S. Ser. No. 07/768,937, now abandoned; and U.S. Ser. No. 07/768,419, now abandoned. All of the older applications mentioned here relate to the field of oil-based drilling fluid systems, especially of the W/O inverted type. Water-based emulsion fluids using oil phases of an increased degradability have been described in the older applications, U.S. Ser. No. 07/776,003, now abandoned and U.S. Ser. No. 07/773,631, now U.S. Pat. No. 5,194,422 and U.S. Ser. No. 07/777,376, now abandoned and the already mentioned application Ser. No. 07/955,738, filed Dec. 7, 1992, now pending.

PROBLEM OF THE INVENTION AND ITS TECHNICAL SOLUTION

It is the object of the invention to employ a substance class in drilling-hole treatment agents of the type concerned here, as the oil phase and/or as an additive in the oil phase, at least partially, the use of which substance class so far has not yet been previously described. At the same time, within the intentions of said older applications, the invention aims to provide an oil phase which is distinguished by its excellent ecological compatibility which is accompanied by a good performance—which may even be improved over that of oil phases so far used—in the respective case of use in practice.

DESCRIPTION OF THE INVENTION

Other than in the operating examples, or where otherwise indicated, all numbers expressing quantities of ingredients or reaction conditions used herein are to be understood as modified in all instances by the term "about".

The inventive teaching is based on the recognition that selected esters of polycarboxylic acids are excellent substituting oils and/or additives within the object of the invention. Said polycarboxylic acid esters may altogether form the respective oil phase in total, but they may be employed also in admixture with other oils, especially those from the class of the so-called non-polluting oils. Particularly suitable as mixing components are monocarboxylic acid ester oils, carbonic acid diesters, oleophilic alcohols and/or ethers from Applicant's previously mentioned older applications.

Thus, the invention, in a first embodiment, relates to the use of oleophilic esters of ecologically compatible polycarboxylic acids with oil-soluble and ecologically compatible monofunctional alcohols and/or polyfunctional alcohols which may also be water-soluble as oil phase or as a constituent of the oil phase of oil- or water-based drilling fluids and other fluid drill-hole treatment agents.

One possible embodiment of this presentation of the invention is the use of said oleophilic polycarboxylic acid esters in the oil phase of oil-based fluids, which especially are employed as inverted sweeping fluids of the W/O type, wherein the polycarboxylic acid esters are present either as an additive of lower concentration in the oil phase, but preferably constitute the at least predominant portion of the oil phase.

In another important embodiment the oleophilic polycarboxylic acid esters are used in water based emulsion fluids of the O/W type. Here also they are present in the dispersed phase at least in a lower concentration, while in a particularly preferred embodiment they comprise the at least predominant portion of said phase.

The invention, in a further embodiment, relates to drill-hole treatment agents which are fluid and pumpable within the temperature range of from 5° C. to 20° C., and more specifically to drilling fluids based on
either a continuous oil phase, especially in admixture with a dispersed aqueous phase (W/O inverted type)
or a dispersed oil phase in a continuous aqueous phase (O/W emulsion type),
said embodiment of the invention being characterized in that said drill-hole treatment agents in the oil phase thereof contain oleophilic polycarboxylic acid esters based on ecologically compatible polycarboxylic acids and on oil-soluble and ecologically compatible monofunctional alcohols and/or water- and/or oil-soluble polyfunctional alcohols.

To all of the embodiments described here of the invention there is applicable the additional possibility of modifying the oleophilic polycarboxylic acid esters in the case of concomitant use of polyhydric alcohols in the ester molecule by the partial concomitant use of monocarboxylic acids—especially to form so-called complex esters.

Further, it is applicable to the embodiments described here of the teaching according to the invention that the drill-hole treatment agents may contain the conventional dissolved and/or dispersed auxiliary materials such as viscosity modifiers, emulsifiers, fluid-loss additives, wetting agents, finely divided weighting agents, Salts, alkali reserve and/or biocides. According to the invention there is applicable the further preferred measure that predominantly those inorganic and/or organic auxiliary and additive materials are included in the use which are ecologically and toxicologically at least largely acceptable.

DETAILED DESCRIPTION OF THE INVENTION AND PREFERRED EMBODIMENTS

Oleophilic esters of polyfunctional carboxylic acids—in this description of the invention also denoted as oleophilic polycarboxylic acid esters—and the production thereof are so much familiar in the art that any detailed references to pertinent literature will not be required. However, the particular suitability of said compounds for a use within the scope of the present teaching so far has not been recognized. This is from where the inventive step starts.

Thus, under a first aspect the invention relates to the use of
a) at least largely water-insoluble polycarboxylic acid esters of mono- and/or polyfunctional alcohols of natural and/or synthetic origin, which solutions are fluid and pumpable within the temperature range of from 0° C. to 5° C.,
or of
b) solutions of at least largely water-insoluble polycarboxylic acid esters of mono- and/or polyfunctional alcohols of natural and/or synthetic origin in ecologically compatible water-insoluble oils, which esters are fluid and pumpable within the indicated temperature range,
as the continuous or dispersed oil phase of oil-based or water-based drilling fluids or other fluid drill-hole treatment agents.

From this representation of the teaching according to the invention it is derivable that the oleophilic polycarboxylic acid esters with respect to the physical properties thereof are capable of covering a wide range.

In a first particular embodiment, the invention intends to employ the oleophilic polycarboxylic acid esters as an oil phase which is as well fluid and pumpable at low temperatures, so that the oil phase—for example of oil-based fluids—exclusively or at least predominantly can have been formed of said oleophilic polycarboxylic acid esters. This condition may be realized in a per se known manner without any problem by observing some structural features of the polycarboxylic acids and the alcohol components, as will be described hereinbelow.

However, the invention is not restricted to this type of oleophilic polycarboxylic acid esters. Also materials which are from highly viscous to solid may be valuable active substances within the scope of the inventive teaching. This may be understood from the following examples:

For water-based O/W emulsion fluids there is not required a high mobility of the dispersed oil phase, and in some cases it is not even desirable. Here oil phases may be advantageous which have been adjusted to have a comparably high viscosity, for example to ensure good lubricating properties. The second possibility for the use of highly viscous or solid polycarboxylic acid esters within the scope of the teaching according to the invention will be realized, if only part of the respective oil phase is formed of the polycarboxylic acid esters and to the remaining part of concomitantly used comparably low-viscosity oils such as the so-called non-polluting oils. One example for this embodiment of the teaching according to the invention is the concomitant use of highly viscous complex esters from polyfunctional carboxylic acids and polyfunctional alcohols, optionally further including the use of monofunctional alcohols and/or monofunctional carboxylic acids, in which case the components forming the polycarboxylic acid esters have been selected—while maintaining the ecological compatibility—that in a per se known manner complex esters will have been formed which are highly suitable in the area of lubricants.

The comparably large range of the specific physical properties selected for the particular case, thus, is due to the various options for formulating drill-hole treating agents of the type concerned according to the invention which, on the one hand, present themselves as pumpable and fluid oil-based materials, the rheology in which case is mostly determined by the properties of the continuous oil phase, while, on the other hand, in the case of the water-based emulsions of the O/W type they ensure the fluidity and pumpability thereof by means of the continuous aqueous phase. An additional enlargement is derived from the possibility as in detail described hereinbelow of employing mixtures of the oleophilic polycarboxylic acid esters with other ecologically compatible oil phases.

THE OLEOPHILIC POLYCARBOXYLIC ACID ESTERS WITHIN THE SCOPE OF THE INVENTION

One element which is conformably relevant to the quality and composition of the oleophilic polycarboxylic acid esters to be employed according to the invention is the requirement of ecological compatibility and toxicological acceptability. This condition will be eventually satisfied by the components used for esterification, i.e. by the polyfunctional carboxylic acids and monocarboxylic acids optionally employed in combination therewith as well as the employed alcohols. Hereto, the following is applicable:

The term ecological compatibility, under one aspect, comprises the biological degradability in the respective eco-system concerned, that is in deep-sea drilling especially the marine eco-system. However, in addition, some farther-reaching consideration deserves attention, especially under the aspect of selecting suitable monofunctional alcohols. Here it is to be considered that in practical use of the oil phases according to the invention in admixture with aqueous phases, and particularly under the elevated temperatures occurring in the drill-hole, partial ester decomposition may occur with the formation of the respective portions of free alcohols. Then the free alcohol will be present in admixture with the remaining components of the oil phase. Here it may be important that the free alcohols will be selected so that any inhalation-toxicological danger to the crew at the drilling site will be definitely excluded. The problem addressed here particularly relates to monofunctional alcohols, as polyfunctional alcohols, even the lowest members thereof, exhibit such low volatily values that the safety as required for practical work will have been a priori constituted.

In the context of these deliberations, the following terms and definitions will be applied:

It is to be generally understood that all compounds and/or mixtures of compounds as defined here that they are oleophilic polycarboxylic acid esters which only have a minor residual solubility in water. As a rule, the solubilities of said esters in the temperature range of from 0° C. to 20° C. at most are about 1% by weight; preferably, the solubility is substantially lower, for example at most 0.5% by weight or even at most 0.1% by weight. It is further generally understood that the polycarboxylic acid esters to be used according to the invention are characterized by their flash point characteristics. The flash points of the oleophilic esters used according to the invention should be at least 80° C. and preferably at least 100° C. For reasons of safety in practical operation it may be desirable to appoint higher limiting values of the flash point of the oil phase, so that flash points in the range of at least about 135° C., and especially those of at least about 150° C., may be of particular practical relevance.

The following indications apply to the composition and structure of the polycarboxylic acid esters falling under the definition according to the invention:

Polyfunctional carboxylic acids for forming the ester oils according to the invention will contain at least 2 carboxyl groups. Nevertheless, in a respective molecule a higher number of reactive carboxyl groups reactive such as to form ester bonds may be present, for example up to 6 carboxyl groups per polycarboxylic acid compound employed. Of particular importance are oleophilic esters derived from ecologically compatible polycarboxylic acids comprising from 2 to 4 carboxyl groups, among which the esters of the respective di- and tricarboxylic acids are especially important.

The polycarboxylic acids may contain, for example, up to about 40 carbon atoms in the starting molecule, while appropriate compounds having from 2 to 18 carbon atoms may be preferred. If polycarboxylic acid esters having a sufficient fluidity and pumpability also in the temperature range of from 0° C. to 5° C. are desired to be produced, then polycarboxylic acids having from 2 to 12 carbon atoms, and especially those having from 4 to 10 carbon atoms, may be of particular importance. For this last-mentioned case, dicarboxylic acids and the dicarboxylic acid esters derived therefrom, respectively, are especially suitable.

The polyfunctional carboxylic acid component may be constituted by one definitely selected polycarboxylic acid or by virtually any optional mixture of polycarboxylic acids or moieties thereof, as long as the requirements according to the invention of ecological compatibility and of the theology demanded in the particular case will have been satisfied. It will be apparent that these basic conditions will be determined not alone by the polyfunctional carboxylic acid component(s) but also by the other components as also used for the esterification, and more specifically by the alcohol components. This will be further discussed hereinbelow.

To the preferred structure of the polyfunctional carboxylic acids there is applicable that in an important embodiment of the invention any use of aromatic moieties in this molecule constituent will be excluded. Particularly suitable are straight-chain and/or branched, and optionally also aliphatic saturated cyclic, basic structures, while in the cases described here olefinically unsaturated components may be basically used as well or used in combination. Dicarboxylic acids, and especially alpha,omega-dicarboxylic acids from the range comprising from 4 to 10 carbon atoms are starting components which are available on a commercial large scale; they may be reacted in a suitable manner with the alcohols to be described hereinbelow to form polycarboxylic acid esters of a freely selectable rheology; hereby, good rheological values also in the lower temperature range mentioned of about 0° C. may again be adjusted in a per se known manner by at least partially employing reactants comprising branched structures. Thus, it has been known for example, that the symmetric diester from adipic acid and 2-ethylhexanol has a melting point in the range of $-67°$ C. and comprises a fluid and pumpable liquid phase in the range of from 0° C. to 5° C. The same is true for comparable diesters of succinic acid, maleic acid and glutaric acid. But also diesters of azelaic acid or sebacic acid with branched monofunctional alcohols may be prepared as comparably readily mobile liquid phases in the range of practical application temperatures and may be used according to the invention. At the same time, esters of the type mentioned here are distinguished by sufficiently high flash points within the definition according to the invention.

Other usable polyfunctional carboxylic acids, for example, are the so-called dimer fatty acids, which as commercial products may often contain considerable amounts of higher carboxylic acids—especially trimer acids—and may be obtained, for example, by oligomerization of monocarboxylic acids, particularly those of natural origin.

Suitable for the esterification with the polyfunctional carboxylic acids are monofunctional alcohols as well as polyfunctional alcohols and mixtures of these types. Here the following is applicable:

Monofunctional alcohols suitable for the formation of polycarboxylic acid esters, more specifically, are oil-soluble compounds of this kind comprising at least 4 carbon atoms, preferably at least 5 and especially at least 6 carbon atoms. An upper limit of the number of carbon atoms is in practice derived only from deliberations on the accessability of the respective monoalcohols. For practical reasons the limit may be at about 40 carbon atoms. Monofunctional alcohols of the range $C_{8-36}$, and especially $C_{8-24}$, may be especially suitable. These alcohol components are preferably free from aromatic molecule constituents and, more particularly, will contain straight-chain and/or branched hydrocarbon chains of natural and/or synthetic origin. The respective alcohols and especially those alcohols comprising a higher number of carbon atoms, for example of $C_{16-24}$, in part may be olefinically mono- or as well poly-unsaturated. The incorporation of olefinic double bonds in a known manner affects the rheology of the corresponding esters to increase the fluidity thereof also at lower temperatures. This property may be utilized according to the invention. However, associated therewith is some susceptibility to oxidation during practical operation, which as the case may be will require the simultaneous use of stabilizing antioxidants and, if appropriate, additional synergistically active auxiliary materials. The reduction of high rheology also into low temperature ranges is also promoted by the use of branched hydrocarbon chains. Here an optimum of ecological compatibility and rheological data of the oil phase for the specific intended use may be found by way of suitable adjustment. The rheology of the polycarboxylic acid esters may be additionally controlled by the additional use of alcohol mixtures. Thereby it is in fact well possible to exclusively employ esters based on straight-chain fatty alcohols of natural origin of the range of $C_{6-18}$, and especially of the range of at least predominantly $C_{8-14}$, even if the polycarboxylic acid ester-based material is to meet high requirements with respect to good rheology also at low temperatures.

Highly mobile ester oils having up to high numbers of carbon atoms of the indicated range may be obtained by at least the portionwise use of branched mono-functional alcohols, for example appropriate synthetic alcohols or from the oligomerization of straight-chain feedstock of natural origin. However, in the same manner as the polycarboxylic acids, also the alcohol components may optionally be derived from saturated and/or olefinically unsaturated cyclic hydrocarbon moieties.

The polyhydric alcohols as simultaneously used if desired also comprise a wide range of the numbers of carbon atoms in the molecule. Especially suitable are the polyhydric alcohols comprising from 2 to 40 carbon atoms, and preferably from 2 to 12 carbon atoms. The polyhydric alcohols simultaneously used in the formation of the polycarboxylic acid esters may be water-soluble and/or oil-soluble. Also in the form of their lowest members, for example in the case of ethylene glycol, they do not possess high volatility. Generally they are acceptable under toxicological, and particularly under inhalation-toxical aspects. Preferred are polyfunctional alcohols having up to 5 hydroxyl groups, and preferably having 2 and/or 3 hydroxyl groups, as the ester-forming components of the oil phase based on polycarboxylic acid esters.

The polyfunctional alcohols may have been incorporated in different forms in the specific structure of the oil phase employed based on polycarboxylic acid esters according to the invention. More specifically, three types of structures are to be considered:

The polyfunctional alcohol may be present as ester moiety bonded to the carboxy group(s) of the polycarboxylic acid(s), which ester moiety will be hydroxyl group-terminated or bonded to a concomitantly used mono-functional carboxylic acid. The polyfunctional alcohol may also be a chain-extending link forming ether groups between the carboxyl group and the esterifying mono-functional alcohols. Eventually, the use of the polyhydric alcohol may result in the formation of oligomeric polycarboxylic acid esters.

As to the molecular structures preferred according to the invention for such polyfunctional alcohols, there are applicable the indications relating to the polycarboxylic acids and the monofunctional alcohols. That is, here also basic structures are suitable which are derived from straight-chain and/or branched, optionally olefinically unsaturated, hydrocarbon chains, which also here may include especially corresponding non-aromatic cyclic structures.

The concomitant use of polyhydric alcohols in the formation of the oleophilic polycarboxylic acid esters may gain specific importance if within the definition of the invention complex polyester exhibiting a marked lubricant character are to be employed or at least to be included in the use. It has been known that in the formation of such highly viscous oligomeric polycarboxylic acid esters polyhydric polyols such as neopentyl glycol or trimethylolpropane may play an important role. But also other polyhydric alcohols having 2 or 3 hydroxyl groups and especially from 2 to 6 carbon atoms are polyester structural components which may also be concomitantly used within the scope of the invention. From the pertinent literature relating to complex polyesters in the field of lubricant technology, reference is made to the publication by M. Wildersohn in "Tribologie und Schmierstofftechnik", Vol. 32 (1985), pages 70 to 75, and to Ullmann, "Enzyklopädie der technischen Chemie", 4th Edition (1984), Vol 20, pp 457 to 671.

More specifically, in this context an additional modification of the complex ester molecule by monocarboxylic acids may be of interest. Applicable to these reactants are also the indications relating to preferred structures: straight-chain or branched, optionally cyclic—but free from aromatic constituents—with the possible presence of olefinically unsaturated moieties. Suitable monocarboxylic acids are the representatives of lower numbers of carbon atoms—especially $C_{1-6}$—as well as acids comprising longer chains such of, e.g., $C_{8-24}$, and especially $C_{12-18}$, while acids of natural origin may be preferred.

If, within the scope of the invention, such complex carboxylic acid polyesters will be used or included in the use, then here, more specifically, the particular case as already referred to is involved in which the oleophilic polycarboxylic acid esters are added as additive to the liquid drill-hole treatment agents. Here, as rule, the amount of the additive is at most about 15% by weight, and especially in the range of from about 1 to 10 and often not more than 8% by weight, each relative to the oil phase. The viscosity inherent to such additives based on polycarboxylic acid esters may extend into the range of solids. Preferably, the Brookfield (RVT) viscosity thereof, determined at 20° C., has a maximum value of about 8 millions mPa.s, and preferably not in excess of 5 millions mPa.s. Also in the case of water-based O/W emulsion fluids, comparably tough-viscous oil phases based on the oleophilic polycarboxylic acid esters may be used, while here suitable limits of the Brookfield (RVT) viscosity at 20° C. are within the range of up to about 3 millions mPa.s, and preferably up to about 1 million mPa.s. It is just in this last-described case that oleophilic polycarboxylic acid esters of a complex structure may be important which esters have been produced with the concomitant use of polyhydric alcohols.

Thus, the case as last set forth here of the use of the polycarboxylic acid esters embodied according to the invention, with respect to the rheology requirements, is clearly distinguished from the possibility as discussed earlier of exclusively or at least by far predominantly using the oleophilic polycarboxylic acid ester especially as the continuous oil phase in drill-hole treatment agents also at low temperatures. Polycarboxylic acid ester oils of this kind, in a preferred embodiment, should have a Brookfield (RVT) viscosity in the temperature range of from 0° C. to 5° C. of not more than 55 mPa.s, and preferably not higher than 45 mPa.s. Here, it will be possible, for example in the sector of the inverted drilling sweeping fluids of the W/O type, to provide oil-based sweeping fluids having a plastic viscosity (PV) within the range of from about 10 to 60 mPa.s, and a flow limit (yield point, YP) within the range of from about 5 to 40 lb/100 ft²—each determined at 50° C.—which fluids have been exclusively based on the oleophilic polycarboxylic acid esters.

The question of the viscosity inherent to the respective employed polycarboxylic acid ester or polycarboxylic acid ester mixture also loses some of its importance, if these materials defined according to the invention are used in admixture with other oil phases. More particularly this will be valid, if the polycarboxylic acid esters will comprise minor amounts in the admixtures forming the oil phase and here will modify certain properties in a certain way, for example ensure a higher lubricating effect, without crucially affecting the rheology of the total system.

POSSIBLE COMPONENTS TO BE ADMIXED TO THE OIL PHASE

Oil components suitable for being admixed within the scope of the invention in the first place are the mineral oils as employed in the present-day practice of drilling fluids, and preferably aliphatic and/or cycloaliphatic hydrocarbon fractions which are substantially free from aromatics. Reference is made to the pertinent state of the art as represented by printed publications and to the pertinent products as commercially available in the market.

However, within the scope of the invention particularly important components for mixing are environmentcompatible oleophilic alcohols, corresponding ethers, carbonic acid ester oils and/or monocarboxylic acid ester oils such those in detail described in Applicant's older applications as initially mentioned. Hereby the subject matters of these older applications are incorporated by reference in the disclosure of the present description of the invention, while some essential aspects of said older technical teachings may be featured hereinbelow.

The oleophilic mixing components based on alcohols, ethers, carbonic acid esters and/or monocarboxylic acid esters may comprise the predominant portion of the oil phase. Then, polycarboxylic acid esters within the meaning according to the invention are concomitantly used for adjusting certain material properties. Nevertheless, as a rule, here the amount of the polycarboxylic acid ester will be at least about 1% by weight, and especially some percent by weight of the oil phase, for example at least about 5% by weight and preferably up to 35% by weight. Oleophilic alcohols, for example, may be of interest for numerous purposes of use as main component of the oil phase which component is stable to hydrolysis. However, such alcohols frequently exhibit an insufficient lubricating property. In contrast thereto, polycarboxylic acid esters of the definition according to the invention are efficient lubricants. Thus, for example, it may be appropriate to employ mixed oil phases which contain at least 10% by weight, and especially from about 15 to 50% by weight, of the polycarboxylic acid ester. More particularly, under working conditions which require a reduced hydrolytic attack, that is, for example, to oil-based fluids including those of the W/O inverted type, the predominant or even exclusive use of the polycarboxylic acid esters may be particularly useful. Proportions of from about 50 to 95% by weight of the oil phase are characteristic for mixed oil phases of the type concerned here.

It is further important that all these additives have flash points of at least 80° C. and preferably of at least 100° C., while substantially higher values, for example those in excess of 150° C., may be especially suitable. Further important for an optimum utilization of the goal of the invention is the requirement that said alcohols, ethers and/or ester oils have a constitution which renders them biologically and ecologically compatible and, more specifically are also acceptable, even in consideration of a partial hydrolysis thereof, under the aspect of inhalation toxicology. Here, to the effect there are applicable in detail the deliberations set forth above with respect to the polycarboxylic acid esters and the alcohol components employed therefor.

Some notes may also be required to the monocarboxylic acids formed upon partial hydrolysis of concomitantly used carboxylic acid ester oils. Said notes are likewise applicable to a concomitant use of the monocarboxylic esters under the aspect initially mentioned of the complex esters. Here, two basically different types—the transition between both being continuous—may be distinguished dependently on the particular constitution of the carboxylic acid employed: Monoarboxylic acids resulting in salts of carboxylic acids which have emulsifier activity, or in salts which are inert. This is crucially determined by the chain length of the respectively released carboxylic acid molecule. To be further considered is the salt-forming cation which is usually provided from the alkali reserve of the drilling fluid. Here, generally the following rules are applicable:

Lower carboxylic acids, for example those having from 1 to 5 carbon atoms, lead to the formation of inert salts, for example to the formation of the respective acetates or propionates. Fatty acids having a higher chain length, and especially those of the range of $C_{12-24}$, lead to compounds with emulsifier activity. Greater details thereto are found in the quoted older applications relating to carboxylic acid ester oils as an oleophilic phase in drilling fluids of the W/O type or of the O/W type, respectively.

If oleophilic carboxylic acid ester oils are concomitantly used as a component of the mixture, then according to the invention they will preferably fall in one of the following subclasses:
a) Esters of $C_{1-5}$-monocarboxylic acids and mono- and/or polyfunctional alcohols, whereof the moieties of monohydric alcohols comprise at least 6 carbon atoms and preferably at least 8 carbon atoms and the polyhydric alcohols preferably have from 2 to 6 carbon atoms in the molecule,
b) Esters of monocarboxylic acids of synthetic and/or natural origin comprising from 6 to 16 carbon atoms, and more specifically esters of aliphatic saturated monocarboxylic acids and mono- and/or polyfunctional alcohols of the kind mentioned in a),
c) Esters of olefinically mono- and/or polyunsaturated monocarboxylic acids having at least 16, and especially 16 to 24 carbon atoms and especially monofunctional straight-chain and/or branched alcohols.

Starting materials for recovering numerous monocarboxylic acids falling under these subclasses, especially those having a higher number of carbon atoms, are vegetable and/or animal oils. There may be mentioned coconut oil, palm kernel oil and/or babassu oil, especially as feedstock for the recovery of monocarboxylic acids of the prevailing range up to $C_{18}$ and of essentially saturated components. Ester oils of vegetable origin based on olefinically mono- and optionally polyunsaturated carboxylic acids of the range of $C_{16-24}$ are, for example, palm kernel oil, peanut oil, castor oil, sunflower oil, and especially rapeseed oil. Carboxylic acids of animal origin of this kind include, for example, the appropriate mixtures from tallow and/or fish oils such as herring oil.

ADDITIVES TO THE OIL-BASED AND/OR WATER-BASED FLUID

Valid are here the general laws to be observed for the compositions of the respective treatment liquids, with respect to which exemplifying indications are set forth by means of the respective drilling muds.

Inverted drilling muds conventionally contain, together with the continuous oil phase, the finely dispersed aqueous phase in amounts of from 5 to 45% by weight, and preferably in amounts of from about 5 to 25% by weight.

To the rheology of inverted drilling fluids according to the invention, there are applicable the following rheological data: Plastic viscosity (PV) within the range of from about 10 to 60 mPa.s, and preferably from about 15 to 40 mPa.s; flow limit (yield point, YP) within the range of from about 5 to 40 lb/100 ft$^2$, and preferably within the range of from about 10 to 25 lb/100 ft$^2$,—each determined at 50° C. The determination of these parameters, the methods of measurement employed therefor, and the further conventional composition of the inverted drilling fluids described here is in detail in accordance with the indications of prior art as initially quoted and have been extensively described, for example, in the reference book "Manual of Drilling Fluids Technology" by the company NL-Baroid, London, GB, cf. therein especially the chapter "Mud Testing—Tools and Techniques" and "Oil Mud Technlogy", which reference book is freely available to the interested artisans.

In emulsion fluids, the dispersed oil phase is conventionally present in amounts of from at least about 1 to 2% by weight, and frequently in amounts of at least about 5% by weight, and preferably of at least about from 7 to 8% by weight as an O/W emulsion. Here the oil portion preferably should not exceed about 50% by weight and particularly comprise not more than about 40% by weight—the % by weight being based on the sum of the unweighted liquid portions of oil/water.

Besides the water content, there are to be taken into consideration all of the additives provided for comparable types of fluids, the addition of which in the conventional manner is related to a specifically desired profile of properties of the drilling fluid. Said additives may be water-soluble, oil-soluble and/or water-dispersible and/or oil-dispersible.

Classical additives include: Emulsifiers, fluid-loss additives, soluble and/or insoluble materials to build-up structural viscosity, alkali reserve, agents for inhibiting an undesirable water exchange between drilled formations—e.g. water-swellable clays and/or salt layers—and the, e.g., water-based drilling fluid, wetting agents for an improved strike of the emulsified oil phase on solid surfaces, e.g. for improving the lubricating effect, but also for improving the oleophilic closure of exposed rock formations, e.g. rock surfaces, biocides, for example for inhibiting bacterial onset and growth of O/W emulsions and the like. In detail, reference is here to be made to pertinent prior art such as described, for example, in the technical literature as initially quoted; cf., more specifically, Gray and Darley, loc. cit., Chapter 11, "Drilling Fluid Components". Just by way of an excerpt, there may be quoted:

Finely dispersed additives for increasing the density of the fluid: Widely used is barium sulfate (baryte), but also calcium carbonate (calcite) or the mixed carbonate of calcium and magnesium (dolomite) are used.

Agents for a build-up of structural viscosity which simultaneously will act as fluid-loss additives: Here, bentonite or hydrophobized bentonite are to be mentioned in the first place. For salt water fluids, other comparable clays, and more specifically attapulgite and sepiolite are of considerable importance in practice.

Also the concomitant use of organic polymer compounds of natural and/or synthetic origin may be of considerable importance in this connection. There may be especially mentioned starch or chemically modified starches, cellulose derivatives such as carboxymethylcellulose, guar gum, xanthan gum, or also merely synthetic water-soluble and/or water-dispersible polymer compounds, especially of the type of the high molecular weight polyacryl amide components with or without anionic or cation modifications, respectively.

Diluents for regulating the viscosity: The so-called diluents (thinners) may be organic or inorganic in nature. Examples for organic thinners are tannin and/or quebracho extract. Further examples are lignite and lignite derivatives, especially lignosulfonates. However, as has been set forth hereinabove, in a preferred embodiment, just here toxic compounds will not be used, among which in the first place the respective salts with toxic heavy metals such as chromium and/or copper are to be mentioned. Polyphosphate compounds constitute an example of inorganic thinners.

Emulsifiers: Here the type of fluid is crucial. Emulsifiers suitable in practice to form W/O emulsions, more specifically, are selected oleophilic fatty acid salts, for example those based on amidoamine compounds. Examples thereof have been described in the U.S. Pat. No. 4,374,737 already quoted and in the literature described therein.

For the preparation of O/W emulsions, different emulsifiers are required in a per se known manner. However, it has been shown that a stable dispersion to form an O/W emulsion may be much more easily attained than in the case of dispersing neat mineral oils as employed according to prior art. This means a first facilitation. Furthermore it is to be taken into account that upon a concomitant use of ester oils, due to a partial saponification with a participation of a suitable alkali reserve, by a use of longer-chain carboxylic acids effective O/W emulsifiers will be subsequently formed and, thus, will contribute to a stabilization of the system.

Additives inhibiting the undesirable water-exchange with, for example, clays: Here to be considered are the additives known from prior art for oil- and water-based drilling fluids. These include halides and/or carbonates of the alkali and/or alkaline earth metals, whereof the potassium salts, optionally in combination with lime, may be of particular importance.

Reference may be made, for example, to the relevant publications in "Petroleum Engineer International", September 1987, 32–40, and "World Oil", November 1983, 93–97.

Alkali reserves: Here to be taken into consideration are inorganic and/or organic bases adjusted to match the total behavior of the fluid, and more particularly basic salts or hydroxides of alkali and/or alkaline earth metals as well as organic bases. Kind and amount of these basic components will have been selected and mutually adjusted in a known manner so that the drilling hole treating agents will be adjusted to a pH value within the range of from about neutral to moderately basic, especially to the range of from about 7.5 to 11.

In the group of organic bases there is to be made a conceptional differentiation between water-soluble organic bases—for example compounds of the diethanolamine type—and virtually water-insoluble bases of a markedly oleophilic character like those described as an additive to ester oil-based inverted drilling muds in Applicant's initially quoted older application U.S. Ser. No. 07/825,436, now U.S. Pat. No. 5,254,531. It is just the concomitant use of also such oil-soluble bases within the scope of the present invention that falls under the new teaching. Then, however, oleophilic bases of this kind which are especially distinguished by a longer hydrocarbon moiety comprising, for example, from 8 to 36 carbon atoms, are no longer dissolved in the aqueous phase, but are dissolved in the oil phase. Here the basic components have a multiple function. On the one hand they may directly act as alkali reserve. On the other hand they impart some positive charge condition to the dispersed oil droplet and, hence, lead to an increased interaction with negative surface charges as are especially encountered with hydrophilic clays and clays capable of ion-exchange. Thereby, according to the invention influence may be exerted on the hydrolytic cleavage and the oleophilic closure of water-reactive rock layers.

Basically, the amounts of each of the auxiliary materials and additives is within the conventional range and, thus, may be learnt from the relevant literature as quoted.

EXAMPLES

In the following Examples i to 4, by observation of a standard formulation for oil-based drilling fluid systems of the W/O type there are set forth appropriate drilling fluid systems, wherein each continuous oil phase is formed by oleophilic polycarboxylic acid esters within the meaning of the definition according to the invention. The viscosity characteristics are determined with unaged and aged material as follows:

Measurement of the viscosity at 50° C. in a Fann-35-viscosimeter from the company Baroid Drilling Fluids, Inc. In a per se known manner there have been determined the plastic viscosity (PV), the yield point (YP) and the gel strength (lb/100 ft$^2$) after 10 seconds and after 10 minutes. Further determined is the fluid loss value (HTHP).

Ageing of the respective drilling fluid is effected by way of a treatment at 125° C. in an autoclave—in a so-called roller oven—for 16 hours.

The drilling fluid systems are composed in a per se known manner in accordance with the following basic formulation:

230 ml of polycarboxylic acid ester oil
26 ml of water

-continued

| | |
|---|---|
| 6 g | of organophilic bentonite (GELTONE from the company Baroid Drilling Fluids, Inc.) |
| 12 g | of organophilic lignite (DURATONE from the company Baroid Drilling Fluids, Inc.) |
| 2 g | of lime |
| 6 g | of W/O emulsifier (EZ-mul from the company Baroid Drilling Fluids, Inc.) |
| 6 g | of W/O emulsifier (INVERMUL NT from the company Baroid Drilling Fluids, rnc.) |
| 346 g | of baryte |
| 9.2 g | of $CaCl_2 \cdot 2H_2O$ |

Example 1

The oil phase is formed by di-2-ethylhexyl sebacate (commercial product EDENOR-DEHS of Applicant). The characteristic values determined of the unaged and of the aged material—as indicated above—have been compiled in the following Table.

| | Unaged Material | Aged Material |
|---|---|---|
| Plastic viscosity (PV) | 56 | 54 |
| Yield point (YP) | 25 | 17 |
| Gel strength (lb/100 ft$^2$) | | |
| 10 seconds | 10 | 6 |
| 10 minutes | 20 | 12 |

HTHP 5 ml

Example 2

As the continuous oil phase there is employed a polycarboxylic acid ester based on di-2-ethylhexyl adipate.

The following values of the unaged and of the aged material have been determined:

| | Unaged Material | Aged Material |
|---|---|---|
| Plastic viscosity (PV) | 25 | 26 |
| Yield point (YP) | 21 | 15 |
| Gel strength (lb/100 ft$^2$) | | |
| 10 seconds | 8 | 14 |
| 10 minutes | 29 | 26 |

HTHP 3 ml

Example 3

Here as the continuous oil phase there is employed di-n-butyl adipate ( commercial product EDENOR-DBA of Applicant). The amount of the one emulsifier component (EZ-mul) is reduced to 4.2 g.

The characteristic values determined of the unaged and of the aged material are as follows:

| | Unaged Material | Aged Material |
|---|---|---|
| Plastic viscosity (PV) | 28 | 34 |
| Yield point (YP) | 27 | 26 |
| Gel strength (lb/100 ft$^2$) | | |
| 10 seconds | 20 | 14 |
| 10 minutes | 29 | 26 |

HTHP 27 ml

Example 4

Upon repetition of Example 3, however with the use of the full prescribed amount of the respective emulsifier (EZ-mul), the following values have been determined in the indicated manner.

| | Unaged Material | Aged Material |
|---|---|---|
| Plastic viscosity (PV) | 27 | 28 |
| Yield point (YP) | 28 | 14 |
| Gel strength (lb/100 ft$^2$) | | |
| 10 seconds | 15 | 7 |
| 10 minutes | 23 | 13 |

HTHP 44 ml

Comparative Example A

For comparison, a carboxylic acid ester oil is employed as the continuous oil phase in the formulation as initially indicated, which oil comprises an ester mixture comprising substantially saturated fatty acids based on palm kernel and 2-ethylhexanol. It is derived to the by far predominating part from $C_{12/14}$-carboxylic acids and conforms to the following specification:

| | |
|---|---|
| $C_8$: | from 3.5 to 4.5% by weight |
| $C_{10}$: | from 3.5 to 4.5% by weight |
| $C_{12}$: | from 65 to 70% by weight |
| $C_{14}$: | from 20 to 24% by weight |
| $C_{16}$: | about 2% by weight |
| $C_{18}$: | from 0.3 to 1% by weight |

The ester mixture is a bright yellow liquid which has a flash point in excess of 165° C. and a viscosity (Brookfield, 20° C.) of from 7 to 9 cP.

The viscosity characteristics determined with the unaged and aged fluid are as follows:

| | Unaged Material | Aged Material |
|---|---|---|
| Plastic viscosity (PV) | 34 | 34 |
| Yield point (YP) | 10 | 8 |
| Gel strength (lb/100 ft$^2$) | | |
| 10 seconds | 6 | 5 |
| 10 minutes | 10 | 10 |

HTHP 4 ml

If substance mixtures from the ester oils here concerned—polycarboxylic acid esters according to the Examples 1 to 4 and monocarboxylic acid esters according to Comparative Example A—are prepared and employed in the formulation as initially set forth, and the fluids are subjected to the measurements, then comparable results of the values measured with the unaged and aged materials are obtained at virtually any mixing ratio.

Example 5

In the following Example 5, a water-based emulsion fluid using a complex oleophilic polycarboxylic acid ester as the dispersed oil phase is prepared according to the following procedure:

First, a homogenized slurry containing 6% by weight of bentonite is produced from a commercially available bentonite (non-hydrophobized) and tap water and the pH value thereof is adjusted to from 9.2 to 9.3 with caustic soda solution.

This pre-swollen bentonite phase is charged and, in subsequent process steps—each with thorough mixing—, the individual components of the water-based carbonic acid diester-oil emulsion are incorporated in accordance with the following formulation:

| | |
|---|---|
| 350 g | of 6% by weight bentonite solution |
| 1.5 g | of commercial carboxymethylcellulose (of low viscosity) (Relatin U 300 S 9) |
| 35 g | of sodium chloride |
| 70 g | of complex ester |
| 1.7 g | of emulsifier (sulf. castor oil "Turkey-red oil") |
| 219 g | of baryte |

As the oleophilic ester oil phase there is employed the reaction product of trimethylolpropane (14% by weight), a commercially available dimer fatty acid mixture (24% by weight) and oleic acid as the balance. The dimer fatty acid mixture comprises 77% by weight of dimer acids, the balance being comprised of tri- and higher carboxylic acids—here % by weight relative to the dimer fatty acid mixture.

The viscosity of the O/W emulsions fluids thus prepared is determined as follows:

First at room temperature the plastic viscosity (PV), the yield point (YP) and the gel strength after 10 seconds and 10 minutes of the unaged emulsion fluid are determined with the unaged material.

Then the emulsion fluid is aged at 90° C. for 16 hours under static conditions, in order to test the influence of the temperature on the stability of the emulsion. Then the viscosity values are once more determined at room temperature.

The details are as follows:

Example 5

| | Unaged Material | Aged Material |
|---|---|---|
| Plastic viscosity (PV) | 16 | 14 |
| Yield point (YP) | 105 | 114 |
| Gel strength (lb/100 ft$^2$) | | |
| 10 seconds | 51 | 54 |
| 10 minutes | 52 | 54 |

We claim:

1. A drill-hole treatment composition which is fluid and pumpable in the temperature range of from about 5° C. to about 20° C., said composition having an oil phase and an aqueous phase, said oil phase comprising an oleophilic polycarboxylic acid ester based on polycarboxylic acids and oil-soluble monofunctional alcohols or water-soluble or oil-soluble polyfunctional alcohols.

2. A drill-hole treatment composition according to claim 1 wherein said oil phase comprises the continuous phase of said composition.

3. A drill-hole treatment composition according to claim 1 wherein said aqueous phase comprises the continuous phase of said composition.

4. A drill-hole treatment composition according to claim 1 further containing an auxiliary agent selected from the group consisting of a viscosity modifier, emulsifier, fluid-loss additive, wetting agent, finely-divided weighting agent, salt, alkali reserve, and biocide.

5. A drill-hole treatment composition according to claim 1 wherein said monofunctional alcohols are straight-chain or branched, are free from aromatic molecular constituents, and contain at least 4 carbon atoms.

6. A drill-hole treatment composition according to claim 5 wherein said monofunctional alcohols contain from 8 to 40 carbon atoms.

7. A drill-hole treatment composition according to claim 1 wherein said polyfunctional alcohols contain from 2 to 5 hydroxyl groups and from 2 to 40 carbon atoms.

8. A drill-hole treatment composition according to claim 1 wherein said polycarboxylic acids contain from 2 to 4 carboxyl groups and up to 40 carbon atoms.

9. A drill-hole treatment composition according to claim 1 wherein said oil phase has a flash point of above 80° C.

10. A drill-hole treatment composition according to claim 1 further containing an oleophilic carboxylic acid ester oil, oleophilic alcohol, oleophilic ether, or oleophilic carbonic acid diester which is fluid and pumpable at a temperature of from about 0° C. to about 5° C.

11. A drill-hole treatment composition according to claim 1 in the form of W/O invert emulsion wherein said aqueous phase is dispersed in said oil phase in an amount of from about 5% to about 45% by weight, based on the weight of said oil phase and said aqueous phase.

12. A drill-hole treatment composition according to claim 11 having a plastic viscosity of from about 10 to about 60 mPa.s and a yield point of from about 5 to about 40 lb/100ft$^2$ each determined at about 50° C.

13. A drill-hole treatment composition as in claim 1 wherein said oil phase has a Brookfield (RVT) viscosity at a temperature of from about 0° C. to about 5° C. of below about 55 mPa.s.

14. A drill-hole treatment composition according to claim 1 in the form of an O/W emulsion wherein said oil phase is dispersed in said aqueous phase in an amount of from about 1% to about 50% by weight, based on the weight of said aqueous phase and said oil phase.

15. A drill-hole treatment composition according to claim 1 wherein said oil phase further contains complex esters having a lubricant property, said esters being based on polyfunctional carboxylic acids and polyfunctional alcohols.

16. A drill-hole treatment composition according to claim 1 having a pH of from about 7.5 to about 11.

17. A drill-hole treatment composition as in claim 1 wherein said oil phase further contains an ester selected from the group consisting of (a) an ester of a $C_1$–$C_5$ monocarboxylic acid and a monofunctional alcohol having at least 6 carbon atoms or a polyfunctional alcohol having from 2 to 6 carbon atoms, (b) an ester of a $C_6$–$C_6$ monocarboxylic acid and a monofunctional alcohol having at least 6 carbon atoms or a polyfunctional alcohol having from 2 to 6 carbon atoms, and (c) an ester of a $C_{16}$–$C_{24}$ mono- or poly-unsaturated monocarboxylic acid and a monofunctional alcohol.

18. The process of treating a drill-hole, comprising contacting said drill-hole with a composition which is fluid and pumpable in the temperature range of from about 5° C. to about 20° C., said composition having an oil phase and an aqueous phase, said oil phase comprising an oleophilic polycarboxylic acid ester based on polycarboxylic acids and oil-soluble monofunctional alcohols or water-soluble or oil soluble polyfunctional alcohols.

19. A process as in claim 18 wherein said oil phase comprises the continuous phase of said composition.

20. A process as in claim 18 wherein said aqueous phase comprises the continuous phase of said composition.

21. A process as in claim 18 wherein said composition further contains an auxiliary agent selected from the group consisting of a viscosity modifier, emulsifier, fluid-loss additive, wetting agent, finely-divided weighting agent, salt, alkali reserve, and biocide.

22. A process as in 18 wherein said monofunctional alcohols are straight-chain or branched, are free from aromatic molecular constituents, and contain at least 4 carbon atoms.

23. A process as in 18 where said monofunctional alcohols contain from 8 to 40 carbon atoms.

24. A process as in 18 wherein said polyfunctional alcohols contain from 2 to 5 hydroxyl groups and from 2 to 40 carbon atoms.

25. A process as in claim 18 wherein said polycarboxylic acids contain from 2 to 4 carboxyl groups and up to 40 carbon atoms.

26. A process as in 18 wherein said oil phase has a flash point of above 80° C.

27. A process as in 18 wherein said composition further contains an oleophilic carboxylic acid ester oil, oleophilic alcohol, oleophilic ether, or oleophilic carbonic acid diester which is fluid and pumpable at a temperature of from about 0° C. to about 5° C.

28. A process as in 18 wherein said composition is in the form of a W/O invert emulsion and said aqueous phase is dispersed in said oil phase in an amount of from about 5% to about 45% by weight, based on the weight of said oil phase and said aqueous phase.

29. A process as in claim 28 wherein said composition has a plastic viscosity of from about 10 to about 60 mPa.s and a yield point of from about 5 to about 40 lb/100 ft$^2$, each determined at about 50° C.

30. A process as in 18 wherein said oil phase has a Brookfield (RVT) viscosity at a temperature of from about 0° C. to about , 5° C. of below about 55 mPa.s.

31. A process as in 18 wherein said composition is in the form of an O/W emulsion and said oil phase is dispersed in said aqueous phase in an amount of from about 1% to about 50% by weight, based on the weight of said aqueous phase and said oil phase.

32. A process as in 18 wherein said oil phase further contains complex esters having a lubricant property, said esters being based on polyfunctional carboxylic acids and polyfunctional alcohols.

33. A process as in 18 wherein said composition has a pH of from about 7.5 to about 11.

34. A process as in claim 18 wherein said oil phase further contains an ester selected from the group consisting of
(a) an ester of a $C_1$–$C_5$ monocarboxylic acid and a monofunctional alcohol having at least 6 carbon atoms or a polyfunctional alcohol having from 2 to 6 carbon atoms, (b) an ester of a $C_6$–$C_{16}$ monocarboxylic acid and a monofunctional alcohol having at least 6 carbon atoms or a polyfunctional alcohol having from 2 to 6 carbon atoms, and (c) an ester of a $C_{16}$–$C_{24}$ mono- or poly-unsaturated monocarboxylic acid and a monofunctional alcohol.

* * * * *